United States Patent [19]
Oswald

[11] Patent Number: 5,210,474
[45] Date of Patent: May 11, 1993

[54] DIGITAL-ANALOG DRIVER FOR BRUSHLESS D.C. SPINDLE MOTOR

[75] Inventor: Richard K. Oswald, San Jose, Calif.

[73] Assignee: Quantum Corporation, Milpitas, Calif.

[21] Appl. No.: 847,147

[22] Filed: Feb. 27, 1992

[51] Int. Cl.$^5$ ............................................. H02P 6/02
[52] U.S. Cl. ..................................... 318/254; 318/138
[58] Field of Search ......................... 318/138, 254, 439

[56] References Cited

U.S. PATENT DOCUMENTS

| | | | |
|---|---|---|---|
| 4,429,262 | 1/1984 | Utenick | 318/254 |
| 4,583,028 | 4/1986 | Angersbach et al. | 318/254 |
| 4,603,283 | 7/1986 | Oltendorf | 318/254 |
| 4,644,234 | 2/1987 | Nola | 318/254 |
| 4,678,973 | 7/1987 | Elliott et al. | 318/254 |
| 4,835,448 | 5/1989 | Dishner et al. | 318/254 |
| 4,922,169 | 5/1990 | Freeman | 318/254 |
| 5,034,668 | 7/1991 | Bausch | 318/254 |

OTHER PUBLICATIONS

King and Carbolante, "Spindle Motor Drive IC Designed in BCD Technology with Improved Transient Characteristics", Proc. 20th Symposium Incremental Motion Control Systems and Device, San Jose, Calif. Jun. 18, 1991, pp. 263–269.

*Primary Examiner*—Bentsu Ro
*Attorney, Agent, or Firm*—David B. Harrison

[57] ABSTRACT

A digital-analog driver circuit for a plural-phase brushless D.C. motor includes a logic circuit responsive to commutation control signals for generating commutation gating signals, a digital function generation circuit responsive to a commutation signal supplied by the logic circuit and further responsive to a high frequency clocking signal, for generating a pulse width modulated digital function signal having a base period of the high frequency clocking signal and a timed interval synchronized to the commutation signal and for supplying the digital function signal to the logic circuit, the logic circuit including a function signal inversion circuit for generating an inverted digital function signal, and having a gating circuit for selectively putting out the digital function signal and the inverted digital function signal in synchronism with the commutation signal, plural digital to analog converters each for converting the digital function signal and the inverted digital function signal into an analog phase driving signal, and plural phase transistor drivers each being responsive to a said analog phase driving signal, for applying a driving current to a phase winding of the brushless D.C. motor.

13 Claims, 5 Drawing Sheets

DIGITAL-ANALOG DRIVER FOR BRUSHLESS D.C. SPINDLE MOTOR

FIELD OF THE INVENTION

The present invention relates to electronic circuits for driving brushless D.C. motors. More particularly, the present invention relates to an electronic digital-analog driver circuit for driving a brushless D.C. spindle motor for a disk drive in a manner which improves performance including reduction of electrical and acoustic noise therefrom.

BACKGROUND OF THE INVENTION

So-called "brushless D.C." motors are actually permanent magnet field polyphase synchronous A.C. motors which are not being driven by sinusoidal A.C. waveform excitation. Because of cost, space and power dissipation requirements, most brushless D.C. motors are driven by discontinuous, "square wave switched" waveforms which at best crudely approximate sinusoidal driving waveforms. The abrupt step function switching of the driving signals are readily generated with digital switching transistor drivers which have minimized heat dissipation (which occurs only during transitional edges of the waveform). However, the use of digital driving signals causes very large rates of change of motor winding currents and/or voltages and results in radiation of A.C. fields from the windings and interconnecting leads and driver electronics with much higher frequency components than the fundamental of the desired sinusoidal waveform. These stray A.C. fields result in electrical noise and interference. In disk drives, for example, low level read channel flux transition sense preamplifiers may be in physically close proximity to the brushless D.C. spindle motor, and the resultant electrical noise may seriously degrade preamplifier performance.

In addition, when driving currents are abruptly switched between motor windings rather than having them change sinusoidally, the point of application of the generated motor torque upon the iron path and windings of the motor abruptly changes; and, these abruptly changed forces cause deformation and vibration that results in very objectionable acoustic noise, particularly for a personal computer or desktop business machine location at which the user is typically in close proximity.

Both full wave and half wave center-tapped or bipolar and unipolar driver and winding connections are used with brushless D.C. motors. In the presently preferred arrangement, a full wave driving configuration is employed during an initial, power-on interval when the spindle motor is spinning up toward its desired operating speed. Once about half the operating speed is reached, a half wave, center-tapped connection is implemented, and this configuration will be discussed in connection with the prior art and with the new circuit design, although the principles of the present invention are readily applicable to, and are easily extended to, full wave or bipolar configurations as may be desired.

Figure 1:
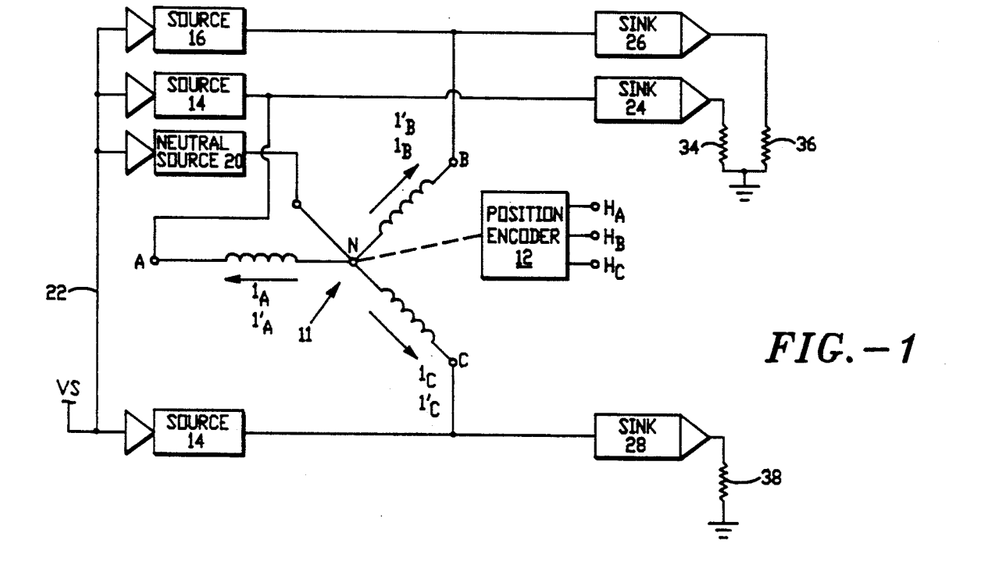
FIG. 1 is an electrical block and schematic drawing of a driver circuit for a D. C. brushless spindle motor incorporating principles of the present invention.
Figure 2:
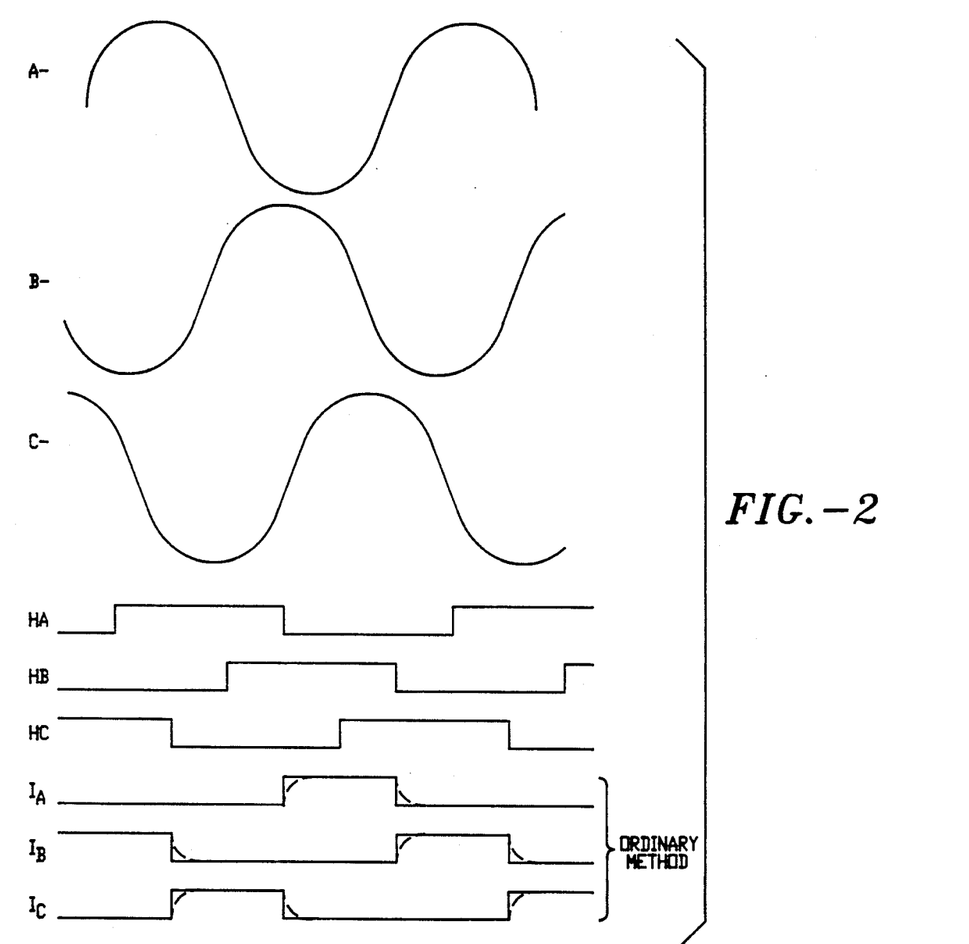
FIG. 2 is a series of motor terminal voltage and phase angle commutation encoder waveforms developed in conjunction with conventional operation of the D.C. brushless spindle motor shown in FIG. 1.

With reference to FIGS. 1 and 2, the commutation phase angle signals for a conventional brushless D.C. motor 11 are obtained either with the aid of some type of position encoder 12 (such as a magnetic encoder employing Hall-effect semiconductor devices), or with the aid of voltage waveform comparators which monitor back EMF induced in the motor windings in so-called "Hall-less" brushless D.C. motors. As shown in FIG. 1, the encoder 12 and suitable downstream processing circuitry produce square wave signals HA, HB and HC (shown in FIG. 2 in relationship to the near sinusoidal motor terminal phase voltages A, B, and C with respect to the neutral or center-tap N of a Y-connected rotating three phase brushless D.C. motor, such as the motor 11 shown in FIG. 1).

Conventional excitation current waveforms are shown in FIGS. 1 and 2 as $I_A$, $I_B$ and $I_C$, with current flow shown in FIG. 1 by arrows associated with each current I. The abrupt edges of these conventional driving signals cause the objectionable electrical and acoustical noise to be generated within the motor 11. It is a common expedient of the prior art to add low pass filters or slew rate limiters of some form to the drivers of these motor systems to produce the dotted waveform segments shown rounding slightly the corners of the step function driving current waveforms $I_A$, $I_B$ and $I_C$ as shown in FIG. 2.

While these prior techniques can be useful to reduce the electrical noise to acceptable levels by attenuating the higher frequency harmonics, they do not adequately solve the acoustic noise problem. While a rate of change of current which is on the order of the inductance to resistance (L/R) time constant of the motor windings (typically a few tens of microseconds) makes the electrical noise acceptably low, this rate of change is still too fast to reduce adequately the acoustic noise. When the rates of change of the motor driving currents are made much longer by known methods employed in the prior art, one or more of a number of difficulties typically arises. First, the effective commutation point at which currents in successive phases reach equal magnitude is delayed so far that motor torque output is significantly reduced, thereby greatly impairing motor efficiency. Second, the start of the switching can be advanced to account for the delay of the switching point by providing considerable additional electronics at greater overall system complexity and cost. However, if the rate is not adjusted to track the amplitude of the current, then the commutation point still varies. This is a problem with many active linear ramp generation circuits. Third, capacitor values of the required low frequency filters become physically bulky and expensive as to be impractical for many small sized applications, such as micro-Winchester and smaller disk drives. Fourth, locating the filter in the active circuitry of the driver achieves a size reduction but results in sensitivity to active device parameter variation tolerances that shift the effective commutation point. Fifth, if the waveforms are exponential functions of time, as is typical of passive filters, they greatly deviate from a sinewave or even a trapezoidal waveform at the edges. Sixth, the sum of turning-on and turning-off waveforms should be constant and equal to the command value to prevent commutation point shift and torque ripple; yet this requirement is very difficult to achieve with filters.

Thus, a hitherto unsolved need has remained for a driver circuit which reduces noise in a brushless D.C. motor without the attendant drawbacks and disadvantages of the prior art as noted hereinabove.

SUMMARY OF THE INVENTION WITH OBJECTS

A general object of the present invention is to provide a driver circuit for a brushless D.C. motor which overcomes limitations and drawbacks of the prior art.

Another more specific object of the present invention is to provide a driver circuit for a brushless D.C. motor which achieves reduced acoustic noise in a simplified, efficient manner, with a controllable electrical digital waveform function generator.

A further specific object of the present invention is to provide a driver circuit for a polyphase brushless D.C. motor which generates and puts out nearly idealized ramp current waveforms with the accuracy of a crystal controlled digital synthesizer and multiplier and employs a separate closed current control loop for each phase power driver in a manner making use of logic circuitry and minimizing the amount of analog circuitry required.

One more specific object of the present invention is to provide a driver circuit for a brushless D.C. motor which generates desired function driving signal waveforms, such as trapezoidal functions, and which employs logic circuitry suitable for implementation in both digital and analog VLSI application-specific logic arrays with a minimum of logical elements, and input/output pin connections required among the arrays.

Yet another specific object of the present invention is to configure digital logic and analog circuitry for implementing a driver circuit for a brushless D.C. motor so that the analog circuits may be located in a single analog integrated circuit array, and so that the digital logic elements may be located in a separate logic-only digital integrated circuit, and wherein the number of signal lines between the two integrated circuits is minimized, thereby minimizing chip external connector pin count in each integrated circuit.

Still one more specific object of the present invention is to provide a high capacity, high performance disk drive having a spindle motor manifesting significantly reduced acoustic noise emanating from the spindle motor assembly during operation of the disk drive.

In accordance with principles of the present invention, a digital-analog driver circuit is provided for a three-phase, brushless D.C. spindle motor e.g., for a disk drive, and includes a commutation phase generation circuit for generating digital commutation control signals for the three phases. The driver circuit includes a logic circuit responsive to the commutation control signals for generating commutation gating signals, a digital function generation circuit responsive to a commutation grating signal supplied by the logic circuit and further responsive to a high frequency clocking signal, for generating a pulse width modulated digital function signal having a base period of the high frequency clocking signal and a timed interval synchronized to the commutation gating signal and for supplying the digital function signal to the logic circuit, the logic circuit including a function signal inversion circuit for generating an inverted digital function signal, and having a gating circuit for selectively putting out the digital function signal and the inverted digital function signal in synchronism with the commutation gating signal, a speed control signal generation circuit for generating a speed control signal corresponding to desired rotational speed of the brushless D.C. motor, a pulse height, pulse width modulator circuit connected between the logic circuit and the digital to analog conversion circuit, the modulator circuit for multiplying each digital function-/inverted digital function signal by a said one of the plural speed control signals, so that a resultant product comprises a function signal having a peak amplitude related to the magnitude of the said speed control signal, three digital to analog conversion circuits each for converting the digital function signal and the inverted digital function signal into an analog phase driving signal, and three commutation phase transistor drivers each being responsive to a said analog phase driving signal, for applying a driving current to a phase of the brushless D.C. motor.

In one aspect of the present invention, the pulse width modulated digital function signal put out by the digital function generation circuit includes a segment comprising a train of digital pulses of progressively changing duty cycle, and wherein the digital function generation circuit comprises a plurality of counters, one of which is set to count a predetermined number of increments within a period of the train of digital pulses, and the other of which is set to count recurrently at the high frequency clocking signal, and a comparator for providing the pulse train in response to a comparison of a count reached by the one counter with the count reached by the other counter, the digital function signal resulting in a generally trapezoidal driving signal as applied to said three commutation phase transistor drivers.

As a further aspect of the present invention, the logic circuit, the speed control signal generation circuit, the pulse height, pulse width modulator circuit, the three digital to analog conversion circuits and the three commutation phase transistor drivers comprise at least a portion of a single analog integrated circuit array, and the digital function generation circuit comprises at least a portion of a single digital integrated circuit array, and wherein there are two signal connection lines connected between the analog integrated circuit array and the digital integrated circuit array associated with the digital-analog driver circuit.

As one more aspect of the present invention, the commutation phase generation circuit comprises a plurality of Hall-effect detectors.

As a still further aspect of the present invention, the brushless D.C. spindle motor comprises a Wye-connected state with a neutral phase connection, and further comprising full-wave, bipolar source-sink three phase drivers operable during initial operation of the brushless D.C. spindle motor, the logic circuit including driving circuitry for driving the full-wave, bipolar source-sink three phase drivers in response to an operational switch control signal and a neutral phase driver in combination with the three commutation phase transistor drivers operable during sustained up-to-speed operation of the brushless D.C. spindle motor, and a spindle motor digital microcontroller for monitoring and controlling said speed control signal generation circuit and for generating said operational switch control signal.

In yet another aspect of the present invention, one counter comprises a presettable 9-bit counter and the other counter comprises a free-running 8-bit counter, and the comparator comprises an 8-bit comparator for comparing the count put out by the lower eight bits of the 9-bit counter with the count put out by the 8-bit counter, after a high order bit of the 9-bit counter has been set, the 9-bit counter further generating a full-count signal for stopping the counting thereof.

As still one more aspect of the present invention, a function generation table lookup circuit may be connected to be addressed by the 9-bit counter for providing an output to the 8 bit comparator, whereby a digital function of predetermined desired characteristic may be generated by the function generation circuit.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 6 A is a detailed block diagram of a control latch within the FIG. 6 digital logic circuit.

DETAILED DESCRIPTION OF A PREFERRED EMBODIMENT

With reference again to FIG. 1, an example 10 of a driver circuit incorporating the present invention provides improved driving signals to the conventional three-phase brushless D. C. motor 11, which in this example is a direct drive spindle motor for a miniature (3.5 inch diameter) fixed disk drive. One example of such a disk drive is found in commonly assigned U.S. Pat. No. 4,027,241 to Hatch, et al., the disclosure of which is hereby incorporated by reference. An exemplary disk spindle assembly including an in-hub spindle motor is described in commonly assigned U.S. Pat. No. 5,031,061 to Hatch, the disclosure of which is hereby incorporated by reference. Other disk drive examples may readily utilize the principles of the present invention.

The three phase brushless D.C. motor 11 includes three sets of windings which are Wye-connected in this example, thereby defining a central connection node, or "neutral" node N, and facilitating unipolar or half wave driving conditions as well as bipolar or full wave driving conditions. In practice, a fixed stator having nine slots (three windings per phase) is used in conjunction with an eight pole permanent magnet rotor, so as to minimize cogging between phases. This nine-slot, eight phase configuration is shown, for example, in Japanese published application No. 59-153,452 (1984) for example, the disclosure of which being hereby incorporated by reference. Later examples of anti-cogging spindle motors are found in U.S. Pat. Nos. 4,774,428, and 4,858,044, for example. Thus, in the motor 11 there are winding sets A-N, B-N and C-N. There are three current source drivers 14, 16 and 18 for full-wave bipolar sourcing of current to the motor windings A-N, B-N and C-N, respectively during a motor start-up operational phase.

When the motor 11 reaches a predetermined suitable intermediate operating speed such as 2400 RPM (40 Hz) as preferably monitored by a motor speed microcontroller 39, the motor driver system 10 switches to half-wave operation in response to a digital control supplied by the microcontroller 39, and a neutral source 20 supplies current to the neutral source node N, and sources 14, 16 and 18 are turned off. Current is supplied from a voltage bus 22 through the source drivers 14, 16, 18 and 20. As is conventional, the current source drivers 14–20 are typically implemented as bipolar PNP power transistors.

Sink drivers 24, 26 and 28 are respectively connected between windings A-N, B-N and C-N to ground. Low value current sense resistors 34, 36 and 38 are respectively connected in series between the drivers 24, 26 and 28 and ground. As is conventional, the sink drivers are typically implemented as N-channel insulated gate field effect power transistors (NFETs). During bipolar (full-wave) operation of the motor 11, current through the windings A-N, B-N and C-N is simultaneously sourced from a supply Vs by source drivers 14, 16 and 18 and sinked to a return path such as ground by sink drivers 24, 26 and 28, in accordance with commutation signals developed by the position encoder 12. During unipolar (half wave) operation of the motor 11, the source drivers 14, 16 and 18 are functionally disabled and replaced by the neutral source driver 20, and current flows from the source Vs through neutral source driver 20 and the neutral source N to the nodes A, B and C in accordance with the commutation signals developed by the encoder 12, for example.

Figure 3:
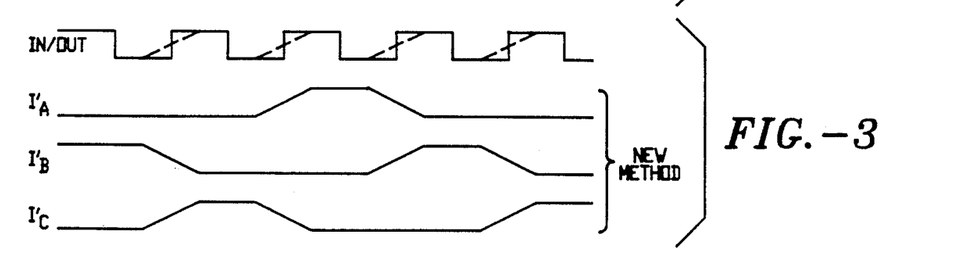
FIG. 3 sets forth a series of waveforms in accordance with principles of the present invention. The FIG. 3 waveforms are graphed along the same horizontal time domain axis as are the waveforms of FIG. 2 in order to clarify and simplify the explanation thereof.

In accordance with principles of the invention, new digitally synthesized function driving signals, such as the trapezoidal driving signals $I'_A$, $I'_B$ and $I'_C$, which closely follow a sinusoidal locus are generated in the digital-analog driver circuit 10 and in this example result in waveforms $I'_A$, $I'_B$ and $I'_C$ shown in FIG. 3. These waveforms are applied by the sink amplifiers 24, 26, 28 during operation of the motor 11 at final steady-state speed such that noise, including electrical noise and particularly including acoustical noise, is significantly reduced. The development of the driving signals $I'_A$, $I'_B$ and $I'_C$ will now be discussed in conjunction with FIGS. 4–7.

Figure 4:
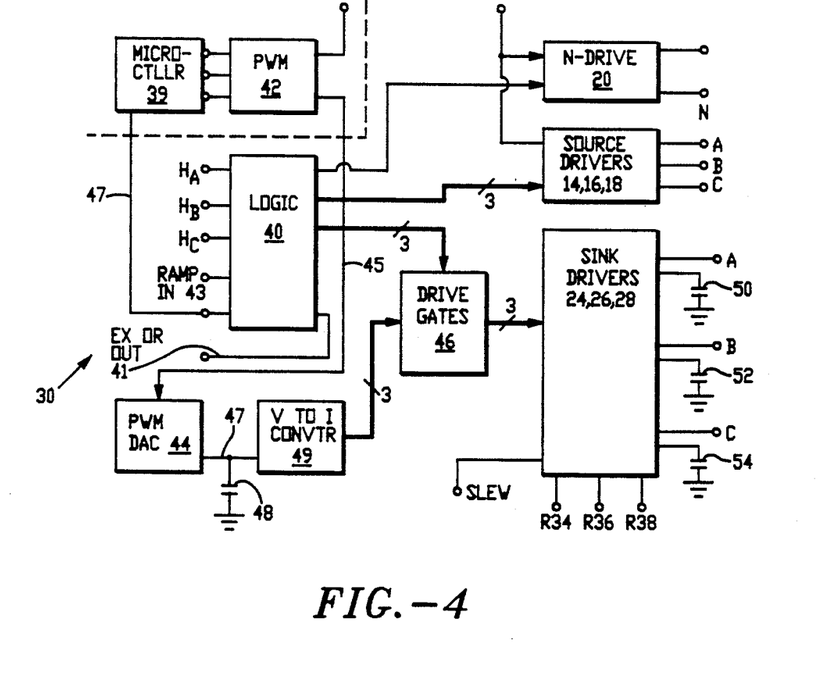
FIG. 4 is a more detailed block diagram of aspects of an analog driving circuit included within the FIG. 1 diagram.

With reference to FIG. 4, an analog portion 30 of the driver circuit 10 includes a switching logic circuit 40, a first pulse width modulator 42 and low pass filter demodulator 44 configured as a digital to analog converter. A signal line 45 supplies the duty cycle modulated logic signal representation of the motor speed command generated by the digital microcontroller 39 from the PWM 42 to the demodulator circuit 44, where it is converted into an analog speed command value Vcont on capacitor 48 and put out on a line 47.

Three drive lines from drive gates 46 provide three driving signals to the sink drivers 24, 26 and 28, while three drive lines from the logic circuit 40 provide driving signals to the source drivers 14, 16 and 18. The capacitor 48 provides a Vcont filter for the demodulator 44. Capacitors 50, 52 and 54 in conjunction with op amps 106, 108, and 110 (FIG. 5) respectively provide PWM low pass ripple filtering of the driving function waveforms $I'_A$, $I'_b$ and $I'_C$ (FIG. 3) applied to the sink drivers 24, 26 and 28.

The digital logic circuit 40 formed with analog circuit cells on the analog IC 30 receives commutation phase sensor inputs HA, HB, and HC from the commutation angle encoder 12. A ramp-in signal output supplied on a line 43 from a digital logic circuit 60 (FIG. 6) is also provided to the logic circuit 40. A unipolar/bipolar commutation control signal on a line 47 is also supplied to the logic circuit 40. An exclusive OR output signal comprising a commutation control signal input (waveform A of FIG. 7) is put out by the logic circuit 40 over a line 41 to the digital circuit 60.

The motor speed voltage control signal Vcont enters a voltage-to-current converter circuit 49. A slew rate control signal SLEW enters the sink drivers 24, 26 and 28, and current sense inputs are also provided from the sense resistors R34, R36 and R38. Except for the first PWM 42, all of the circuit elements shown in FIG. 4 (other than the digital logic block 60) are preferably formed within a single analog integrated circuit array, using known standard cell, analog IC fabrication techniques and processes.

Figure 5:
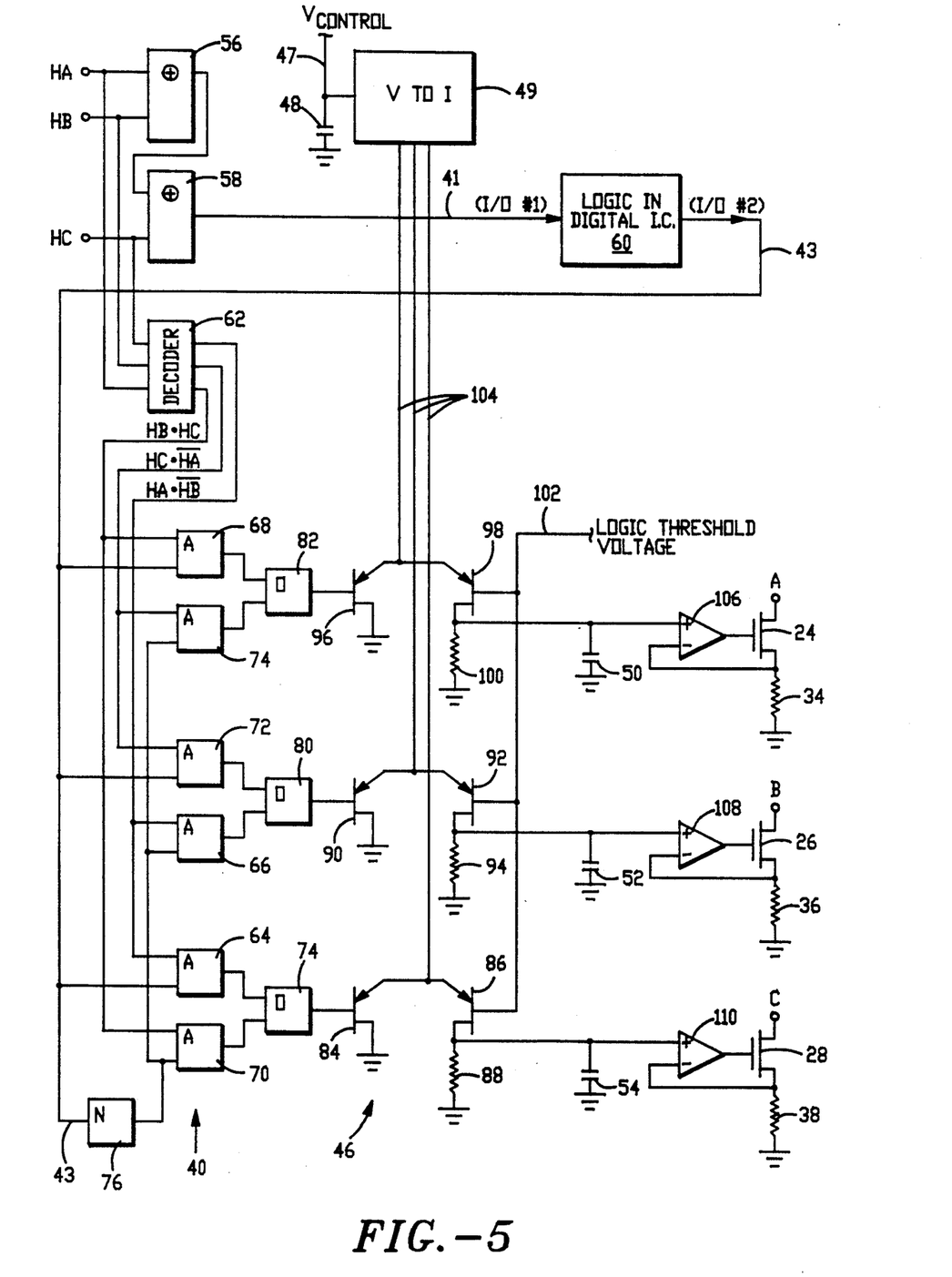
FIG. 5 is a still more detailed block and circuit schematic diagram of the analog circuitry shown in the FIG. 4 diagram.

FIG. 5 shows in greater circuit detail the circuit elements formed within e.g. an analog circuit array 30. The digital logic circuit 40 (formed of analog circuit cells of the analog IC array) includes two exclusive OR gates 56 and 58 which receive the commutation phase signals HA, HB and HC and which develop and put out a clocking signal on the line 43 to the digital circuit 60 synchronized to sensed rotation of the motor 11. The digital logic circuit 60 generates and puts out recurrent PWM ramp signals over the RAMP in line 43. A digital decoder 62 decodes the three commutation phase signals HA, HB and HC into three logic gate signals HA·NOT HB; HB·NOT HC; and, HC·NOT HA.

Figure 6:
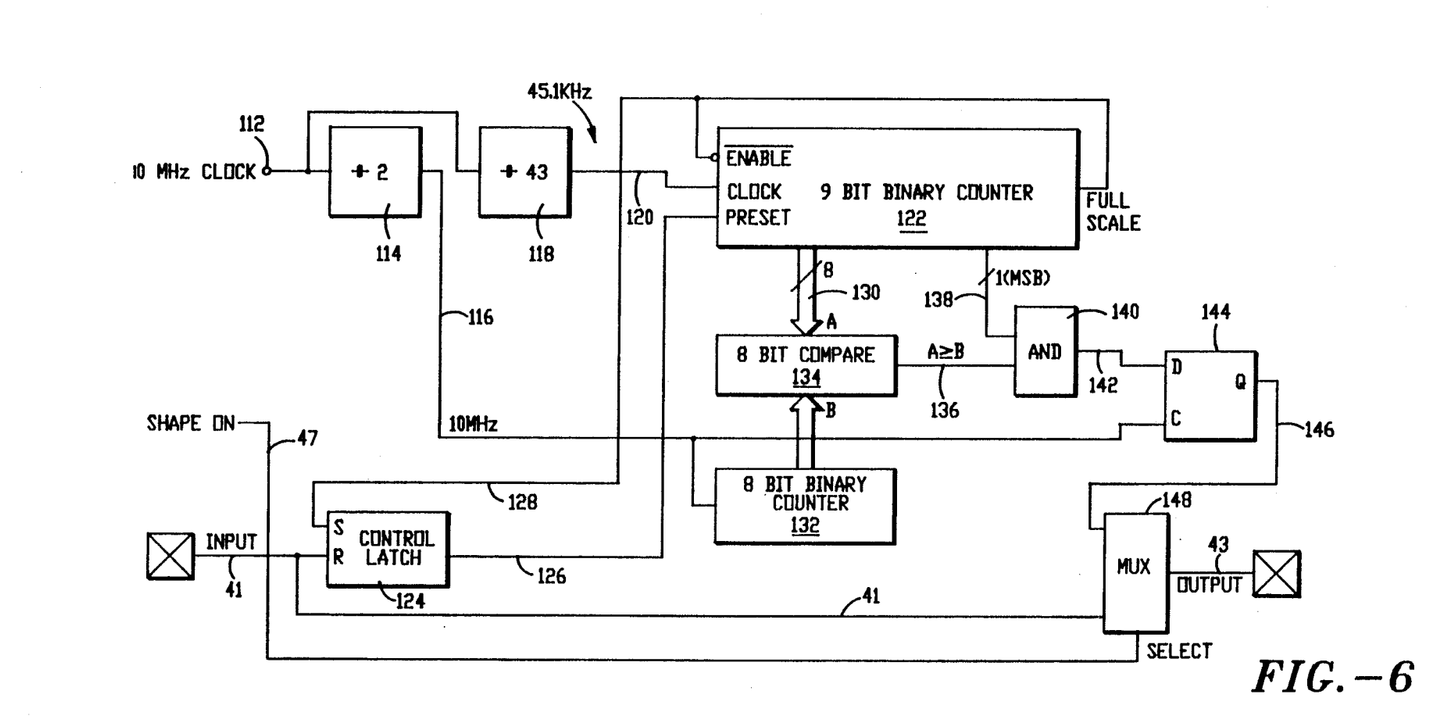
FIG. 6 is a logical block diagram of a digital logic circuit shown as a single block within the FIG. 5 circuitry.

These logic gate signals are applied respectively as inputs to AND gates 64, 66, 68, 70, 72 and 74 as shown in FIG. 5. Another input to the gates 64, 66 and 68 is a digital PWM incline ramp signal provided on the output line 43 from the digital logic integrated circuit 60 (FIG. 6). This signal is inverted by an inverter 76 and then supplied as a decline ramp signal to the three other AND gates 70, 72 and 74, also as shown in FIG. 5. Outputs from AND gates 64 and 70 provide inputs to an OR gate 78. Outputs from AND gates 66 and 74 provide inputs to a second OR gate 80. Outputs from AND gate 68 and 74 provide inputs to a third OR gate 82. The Exclusive OR gates 56 and 58, the commutation phase decoder circuit 62 and the AND gates 64-74 and associated OR gates 78-82 comprise the entirety of the digital logic circuit 40 formed within the analog IC circuit array 30.

The output from the OR gate 78 enters one side of a differential amplifier formed as a pair of emitter-connected PNP transistors 84 and 86 and a load resistor 88. Similarly, the output from the OR gate 80 connects to the base of a PNP transistor 90 having its emitter connected to another PNP transistor 92. A load resistor 94 is connected between the collector of the transistor 92 and ground. In like manner, the output from the OR gate 82 is connected to a base of a transistor 96 having its emitter tied to the emitter of a transistor 98 which also has a load resistor 100. As configured, the transistor pairs 84-86, 90-92 and 96-98 comprise pulse height-pulse width multipliers. Each multiplier is decoded (enabled) in proper phase relationship by decoding of the commutation encoder phase angle signals HA, HB and HC as explained in conjunction with the logic circuit 40, described hereinabove.

The bases of the transistors 86, 92 and 98 are supplied with a logic threshold voltage over a line 102. An input control voltage Vcontrol from a speed regulator circuit is converted into a current by the voltage-to-current converter circuit 49. Three identically matched currents corresponding to the motor speed control voltage are provided by the circuit 49 to the commonly connected emitters of the transistor pairs 84-86, 90-92 and 96-98. These matched currents comprise the commanded current followed by the actual phase current magnitudes put out by the motor driver 10.

The output from each multiplier pair 84-86, 90-92 and 96-98 comprises a variable duty cycle that is averaged by the associated low pass filter integrator, formed by the capacitor 54, 52 or 50. Three amplifiers 106, 108 and 110 respectively provide gate drive control voltages to the NMOS power sink drivers 24, 26 and 28, as shown in FIG. 5.

The resultant waveform put out by each multiplier pair 84-86, 90-92 and 96-98 is a D.C. voltage which is proportional to the control current times a digitally synthesized ramp function that varies alternately from zero to unity and from unity to zero during each cycle of each driving phase. It should be noted that the low pass filters provided by the capacitors 50, 52 and 54 attenuate high frequency ripple of the duty cycle carrier frequency and do not affect ramp slope. Thus, the value for each of the capacitors 50, 52 and 54 is not critical. Importantly, the logic inverter 76 causes the ramps to be inverted e.g. from rising slope to falling slope, rather than requiring a linear analog amplifier with accurate gain control and precise base line reference voltage control.

Turning not to FIG. 6, the digital circuit 60 is preferably formed as a small portion of a much larger high density CMOS VLSI array. The circuit 60 receives a system clock signal at a clock input 112, such as an on-board 20 MHz square wave clock signal which is the same signal or which is phase related to the signal clocking the speed control microcontroller 39. This signal is divided to 10 MHz by a divide-by-two circuit 114, such as a flip-flop, which puts out a 10 MHz square wave signal on a line 116. The clock signal at the input 112 also extends to a programmable divider 118 which in this example is set to divide by 43. The divider 118 thus puts out a square wave on a line having a frequency of 465.1 KHz which is the basic clock period to generate the desired, digitally synthesized driving function phases for a three-phase motor speed operating at a speed of 4500 RPM. This 465.1 KHz signal is supplied as a clock signal to a 9-bit binary counter 122.

Figure 6A:
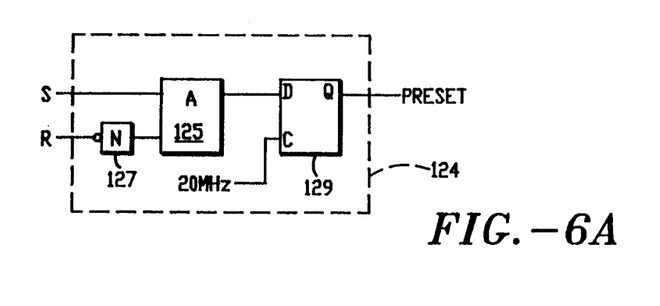

A control latch 124 is provided to resynchronize the input signal from the gate 58 in order to eliminate any tolerances (less than sharp edge transitions) as may result from the considerably slower digital logic implemented with analog circuit cells on the analog IC 30. As shown in FIG. 6A, the control latch 124 includes and AND gate 125 receiving a set input directly from a line 128 and a reset input from the input line 41 as inverted by an inverter 127. The output from the AND gate 125 provides a data input to a flip-flop 129 which is clocked by the 20 MHz clock 112.

The control latch 124 is reset by the incoming exclusive OR signal on the input line 41 (waveform A of FIG. 7) from the gate 58 (FIG. 5). The latched input signal from the control latch 124 is supplied over a line 126 to a preset input of the 9-bit counter 122 to preload it to a predetermined count, which in this example is preferably 080 Hex, although it may easily be made to be programmable by an input from the embedded motor speed microcontroller of the disk drive system with which the driver circuit 10 is preferably associated within a disk drive. A full scale output 128 of the 9-bit counter serves an enable signal for disabling the counter 122 so that it does not continue to count after the maximum duty cycle count is reached within a single counting interval. The full scale output on the line 128 also sets the latch 124.

A free-running 8-bit binary counter 132 configured as a ring counter generates high frequency count values from the 10 MHz clock supplied over the line 116. The eight bit count values are supplied to an 8-bit comparator 134 which also receives eight bit count values put out by the 9-bit counter 122 over a bus 130. After the ninth bit (MSB) of the 9-bit counter 122 is true, an output of the comparator 134 on a line, 136 is true for so long as the lower eight bit count put out by the 9-bit counter 122 equals or exceeds the value of the count put out by the free running 8-bit counter 132. With the free running 8-bit counter 132 running much faster than the 9-bit counter 122, the output from the 8-bit comparator on the line 136 comprises a function including a train of pulses of steadily increasing duty cycle from zero duty cycle to unity duty cycle. The increasing duty cycle is graphed as a dashed line inclined ramp line 137 in waveform C of FIG. 7.

Figure 7:
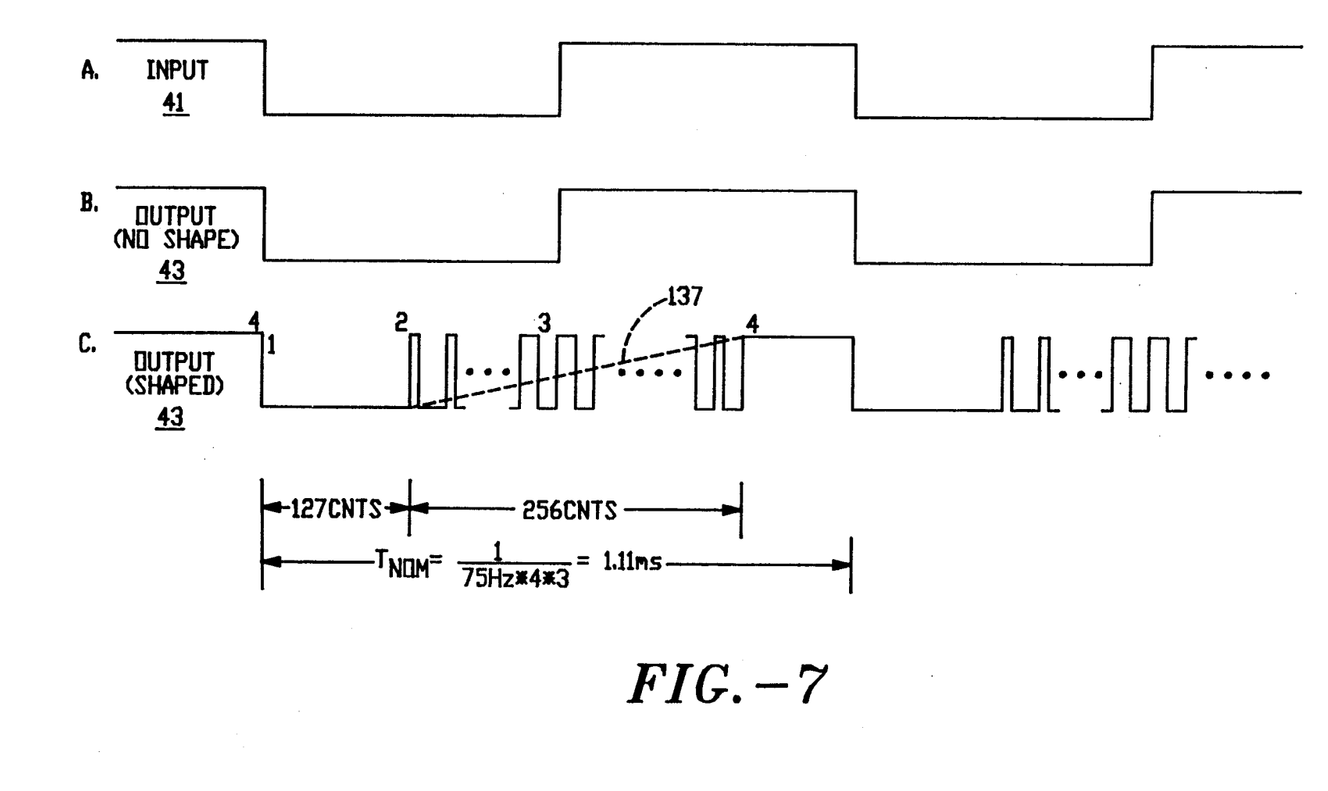
FIG. 7 is a series of current-shaping logic signal waveforms generated by the FIG. 5 circuitry in accordance with principles of the present invention.

When a predetermined count (100 Hex) is reached at point 2 of waveform C of FIG. 7, and AND gate 140 at the output of the comparator 134 becomes enabled, and it is at this point that the ramp portion of the function is put out. The output from the AND gate 140 is reclocked by a D flip-flop 144 to the 10 MHz clock so that any propagation delay through the digital logic circuit 60 does not affect the desired duty cycle ramp.

A true output Q comprising the ramped pulse train portion from the latch 144 is supplied as one input to a multiplexer 148, while another input to the multiplexer 148 is supplied by the input signal on the line 41. A "shape-on" control value on the line 47 as from the speed control microprocessor of the disk drive system causes the multiplexer 148 to select between the pulse train signal on the line 146 and the input signal on the line 150. Thus, when it is necessary to get the spin motor up to running speed as quickly as possible, the ramp generation pulse train circuitry is bypassed.

Turning now to FIG. 7, the input waveform A on the line 41 is seen to be a square wave having a period in this example of 1.11 milliseconds, which corresponds to twelve times the nominal motor speed of 4500 RPM (75 Hz) as achieved with an 8 pole three phase motor, for example. When the shape-on signal on the control line 47 selects the input signal to be the output signal on the line 43, as during the initial up-to-speed bipolar operation of the circuit 10, waveform B of FIG. 7 results. However, when the ramp generation digital logic circuitry of FIG. 6 is enabled as by selecting the signal on the line 146 to be the output supplied over the line 43, waveform C of FIG. 7 is achieved. In order to achieve the function provided by the waveform C graph of FIG. 7, the 9-bit counter 122 is arranged to have a count frequency of 465.1 KHz. The rollover count repetition rate provided by the free running 8-bit counter 132 is 10MHz/256 which is 39.06 KHz.

As shown in waveform C of FIG. 7, the 9-bit counter starts counting at time 1 with a count preset to 080 (Hex). At time 2, when a count of 100 (Hex) is reached, pulses are generated and put out from the latch 144. At time 3, which is the half duty cycle point of the pulses in the resultant pulse train, the count reached by the 9-bit counter is 17F (Hex), for example. When the 9-bit counter 122 reaches a full count of 1FF (Hex) at time 4, it is stopped from counting and does not begin counting again until the next falling edge of the input signal on the line 41. During the active ramp counting interval, denoted as between times 2 and 4 in waveform C of FIG. 7, the width of the pulses put out by the latch 144 is steadily increasing, from very narrow (minimum duty cycle) pulses at the beginning of the counting interval (time 2) to very wide (maximum duty cycle) pulses at the end of the counting interval (time 4). This modulated pulse width pulse train thus becomes a smooth incline ramp commutation signal when integrated in turn by the integrators formed by capacitors 50, 52 and 54. Importantly, the inverter 76 inverts the duty cycle of the ramp and thus provides a smooth decline ramp commutation signal, which is precisely symmetrical with the incline ramp signal, without requiring any special analog circuitry or circuit balance or adjustment. The height of the pulses is controlled by the control voltage Vcontrol, and this height in turn controls the speed of the motor.

For increased flexibility, if the 75 Hz rotation speed of the motor changes, the divisor in the divisor circuit 118 also changes accordingly. If the commutation angle of the motor is made adjustable in order to minimize run current in the motor, the 080 (Hex) present in the 9-bit counter is adjusted by the motor speed control processor 39.

Importantly, in the presently preferred embodiment, only two input/output lines (pins) 43 and 41 are required for the interface connection between the analog circuitry of FIG. 5 and the digital circuitry of FIG. 6. Those skilled in the art will appreciate that the logic circuitry 60 of FIG. 6 could be modified to include a function table look-up between the 9-bit counter 122 and the comparator 134, and with the addition of another comparator output line to the analog circuit of FIG. 5 a symmetrical function of any desired shape, such as a nearly perfect sine wave, will be achieved in lieu of the trapezoid driving signals, without any additional analog components.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A digital-analog driver circuit for a plural-phase-wound, brushless D.C. motor including commutation phase generation means for generating digital commutation control signals for the plural phases, the driver circuit comprising:
  logic means responsive to the commutation control signals for generating commutation gating signals,
  digital function generation means responsive to a commutation gating signal supplied by the logic means and further responsive to a high frequency clocking signal, for generating a pulse width modulated digital function signal having a base period of the high frequency clocking signal and a timed interval synchronized to the commutation gating signal and for supplying the digital function signal to the logic means,
  the logic means including function signal inversion means for generating an inverted digital function signal, and having gating circuit means for selectively putting out the digital function signal and the inverted digital function signal in synchronism with the commutation gating signal,
  plural digital to analog conversion means each for converting the digital function signal and the inverted digital function signal into an analog phase driving signal,
  plural phase transistor driver means each being responsive to one analog phase driving, for applying a driving current to a phase winding of the brushless D.C. motor.

2. The digital-analog driver circuit set forth in claim 1 further comprising speed control signal generation means for generating plural speed control signals corresponding to desired rotational speed of the brushless D.C. motor, and pulse height, pulse width modulator means connected in the driver circuit between the logic means and the digital to analog conversion means, the modulator means for multiplying each digital function/inverted digital function signal by one of said plural speed control signals, so that a resultant product comprises a function signal having a peak amplitude related to the magnitude of said one speed control signal.

3. The digital-analog driver circuit set forth in claim 1 wherein the pulse width modulated digital function signal put out by the digital function generation means includes a segment comprising a train of digital pulses of progressively changing duty cycle, and wherein the digital function generation means comprises a plurality of counter means, one of which is set to count a predetermined number of increments within a period of the train of digital pulses, and the other of which is set to count recurrently at the high frequency clocking signal, and comparator means for providing the train in response to a comparison of a count reached by said one counter means with the count reached by said other counter means.

4. The digital-analog driver circuit set forth in claim 1 wherein the logic means, the plural digital to analog conversion means and the plural phase transistor driver means comprise at least a portion of a single analog integrated circuit array, and wherein the digital function generation means comprises at least a portion of a single digital integrated circuit array, and wherein there are two signal connection lines connected between the analog integrated circuit array and the digital integrated circuit array associated with the digital-analog driver circuit.

5. The digital-analog driver circuit set forth in claim 1 wherein the commutation phase generation means comprises a plurality of Hall-effect detector means.

6. The digital-analog driver circuit set forth in claim 1 wherein the brushless D.C. motor comprises a spindle motor of a fixed disk drive data storage subsystem.

7. A digital-analog driver circuit for a three-phase wound, brushless D.C. spindle motor for a disk drive including commutation phase generation means for generating digital commutation control signals for the three phases, the driver circuit comprising:
  logic means responsive to the commutation control signals for generating commutation gating signals,
  digital function generation means responsive to a commutation gating signal supplied by the logic means and further responsive to a high frequency clocking signal, for generating a pulse width modulated digital function signal having a base period of the high frequency clocking signal and timed interval synchronized to the commutation gating signal and for supplying the digital function signal to the logic means,
  the logic means including function signal inversion means for generating an inverted digital function signal, and having gating circuit means for selectively putting out the digital function signal and the inverted digital function signal in synchronism with the commutation gating signal,
  speed control signal generation means for generating plural speed control signals corresponding to desired rotational speed of the brushless D.C. motor,
  three digital to analog conversion means each for converting the digital function signal and the inverted digital function signal into an analog phase driving signal,
  pulse height, pulse width modulator means connected between the logic means and the digital to analog conversion means, the modulator means for multiplying each digital function/inverted digital function signal by one of said plural speed control signals, so that a resultant product comprises a function signal having a peak amplitude related to the magnitude of said one speed control signal,
  three commutation phase transistor driver means each being responsive to one analog phase driving signal, for applying a driving current to a phase winding of the brushless D.C. motor.

8. The digital-analog driver circuit set forth in claim 7 wherein the pulse width modulated digital function signal put out by the digital function generation means includes a segment comprising a train of digital pulses of progressively changing duty cycle, and wherein the digital function generation means comprises a plurality of counter means, one of which is set to count a predetermined number of increments within a period of the train of digital pulses, and the other of which is set to count recurrently at the high frequency clocking signal, and comparator means for providing the train in response to a comparison of a count reached by said one counter means with the count reached by said other counter means, the digital function signal resulting in a generally trapezoidal driving signal as applied to said three commutation phase transistor driver means.

9. The digital-analog driver circuit set forth in claim 7 wherein the logic means, the speed control signal generation means, the pulse height, pulse width modulator means, the three digital to analog conversion means and the three commutation phase transistor driver means comprise at least a portion of a single analog integrated circuit array, and wherein the digital function generation means comprises at least a portion of a single digital integrated circuit array, and wherein there are two signal connection lines connected between the analog integrated circuit array and the digital integrated circuit array associated with the digital-analog driver circuit.

10. The digital-analog driver circuit set forth in claim 7 wherein the commutation phase generation means comprises a plurality of Hall-effect detector means.

11. The digital-analog driver circuit set forth in claim 7 wherein said brushless D.C. spindle motor comprises a Wye-connected stator with a neutral phase connection, and further comprising full-wave, bipolar source-sink three phase driver means operable during initial operation of the brushless D.C. spindle motor, the logic means including driving means for driving said full-wave, bipolar source-sink three phase driver means in response to an operational switch control signal and a neutral phase driver means in combination with said three commutation phase transistor driver means operable during sustained up-to-speed operation of the brushless D.C. spindle motor, and spindle motor digital microcontroller means for monitoring and controlling said speed control signal generation means and for generating said operational switch control signal.

12. The digital-analog driver circuit set forth in claim 8 wherein said one counter means comprises a presettable 9-bit counter and wherein said other counter means comprises a free-running 8-bit counter, and wherein said comparator means comprises an 8-bit comparator for comparing the count put out by the lower eight bits of the 9-bit counter with the count put out by the 8-bit counter, after a high order bit of the 9-bit counter has been set, the 9-bit counter further generating a full-count signal for stopping the counting thereof.

13. The digital-analog driver circuit set forth in claim 12 further comprising a function generation table lookup means connected to be addressed by the 9-bit counter and for providing an output to the 8-bit comparator, whereby a digital function of predetermined desired characteristic is generated by the function generation table lookup means.

* * * * *